2,782,054

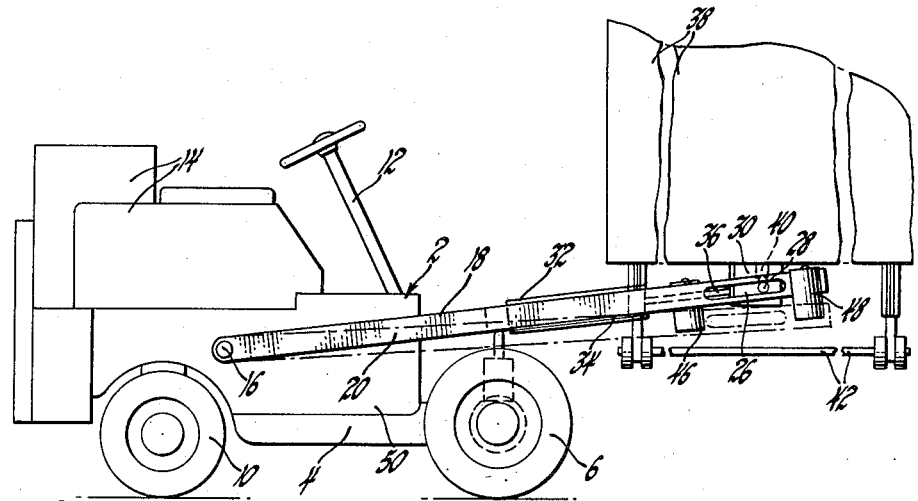
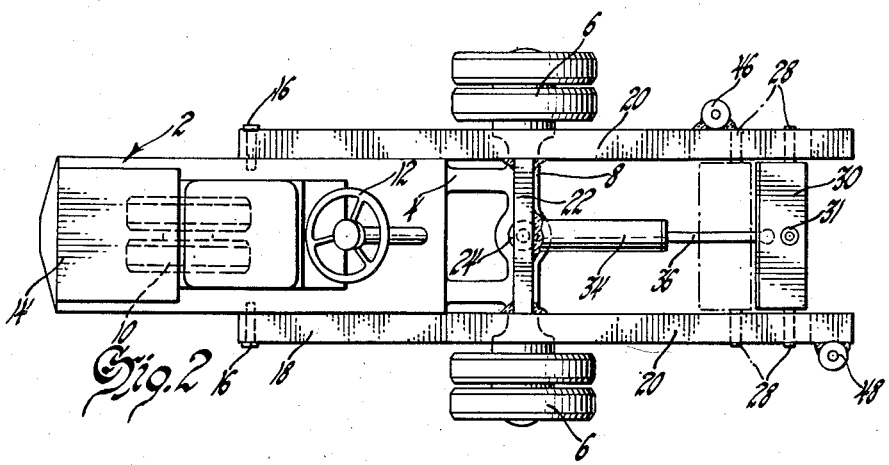
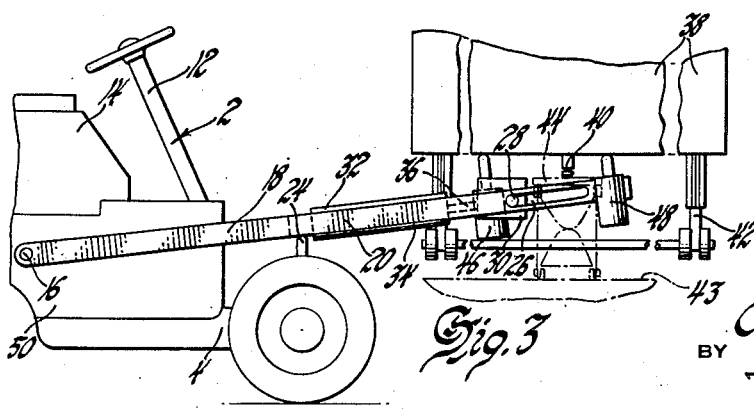
INVENTOR
Corless B. Nelson
BY
L. C. Thorpe
ATTORNEY United States Patent Office 2,782,054
Patented Feb. 19, 1957

LIFT TRUCK WITH HITCH MEANS FOR MANEUVERING SEMI-TRAILERS

Corless B. Nelson, Chicago, Ill., assignor to General Motors Corporation, Detroit, Mich., a corporation of Delaware Application September 21, 1953, Serial No. 381,333

8 Claims. (Cl. 280—479)

This invention relates generally to trucks and more specifically to tractors, small trucks, or the like for loading and unloading motor truck semi-trailers on railway vehicles particularly adapted to carry these semi-trailers.

The railroads are currently trying to encourage the trucking industry to use the railroad facilities for transporting large motor truck semi-trailers or the like between points normally constituting the longer hauls for these trucks and semi-trailers. To make it practical for the trucking industry to use the railroad facilities, however, some means must be devised for rapidly loading and unloading these semi-trailers onto the railway vehicles to save as much time as possible in the transporting thereof.

One of the methods that has been proposed is to load and unload these semi-trailers from the side of the railway vehicle. To load and unload motor truck semi-trailers from the sides of railway vehicles, however, requires considerable maneuvering of the semi-trailers in order to properly position them on the railway vehicle so that they can be safely secured thereto. So far no suitable means has been devised for quickly maneuvering these semi-trailers into position from the sides of the railway vehicles. One reason for this is that the easiest way to maneuver a motor truck semi-trailer is by means of its king pin which normally pivotally resides in the "fifth wheel" of a motor truck tractor. The king pin, however, also forms a natural means for securing the semi-trailer in position on the railway vehicle. In other words, if the king pin is used to maneuver the semi-trailer, it is engaged in the maneuvering means and cannot be inserted in the support provided therefor on the railway vehicle. What is needed, then, is some maneuvering means which, once the semi-trailer has been maneuvered into position on the railway vehicle, will leave the king pin free so that it may be received by supporting means on the railway vehicle.

It is, therefore, broadly an object of this invention to provide means which utilize the semi-trailer king pin for maneuvering and positioning the semi-trailer on the railway vehicle and then frees the king pin so that it may readily be received in the support provided therefor on the railway vehicle.

The specific manner in which this invention accomplishes the above desired result will readily be perceived upon reference to the accompanying detailed description and drawings, in which:

Fig. 1 is a side view of the new loading truck including a hydraulic lift pivotally connected thereto and shows unique means on the end of the lift for receiving the semi-trailer king pin to thereby maneuver the semi-trailer onto the railway vehicle.

Fig. 2 is a plan view of the truck with the pivoted hydraulic lift connected thereto showing a hydraulic ram having means for the reception of the king pin which can be retracted when the king pin is in position over the king pin receiving means on the railway vehicle.

Fig. 3 shows the provision of a pair of hydraulic jacks on either side of the pivoted hydraulic lift which raise the semi-trailer so that the hydraulic ram and the king pin receiving means can be retracted, leaving the king pin free to be inserted in the king pin supporting means on the railway vehicle.

Referring now to the accompanying drawings, a loading truck or tractor generally indicated by the numeral 2 is shown in Fig. 1. The loading truck 2 comprises a frame 4 supported at the front thereof by sets of dual wheels 6 and an axle 8. The rear end of the frame 4 is supported by a set of dual wheels 10 which are controlled by the steering apparatus 12 to maneuver the truck. The rear end of the truck is weighted with suitable ballast 14. Pivotally attached to the frame 4 of the truck 2 intermediate the wheels 6 and 10 by means of pins 16 or other suitable fastening means is a forked lift 18. The forked lift 18 comprises a pair of longitudinally extending beams 20 suitably connected intermediate the ends thereof by a transversely extending beam 22. The forked lift 18 is supported intermediate the ends thereof by means of a hydraulic jack 24 interposed between the transversely extending beam 22 of the lift 18 and the axle 8. The free end of each longitudinally extending beam 20 is provided with a longitudinally extending groove 26. The grooves 26 receive a pair of pins 28 secured to opposite sides of a semi-trailer king pin receiving means 30. The king pin receiving means 30 is provided with a suitable hole 31 for the reception of a semi-trailer king pin. The king pin receiving means 30 having the pins 28 secured thereto is longitudinally movable with respect to the beams 20 by a hydraulic ram 32 pivotally or otherwise suitably secured thereto. The hydraulic ram 32 comprises a cylinder 34 secured to the transverse beam 22 and a rod 36 associated with the cylinder 34 and having an end pivotally anchored to the king pin receiving means 30. Located outboard of each beam 20 at the free ends thereof are a pair of vertically operating hydraulic jacks 46 and 48 diagonally positioned relative to the king pin receiving means 30.

It should be appreciated that any suitable means, as for example an engine 50, may be provided in the truck 2 for driving the truck and also for supplying power to the hydraulic jacks 24, 46 and 48 as well as the hydraulic ram 32.

In order to properly describe the operation of this truck and its ability to efficiently load and unload semi-trailers onto railway vehicles, a semi-trailer has been shown in Fig. 1 which is provided with the usual king pin 40 and landing gear 42. In Fig. 3 the outline of a portion of a railway vehicle is also shown having a load carrying platform or other upper surface 43 which has a king pin receiving and supporting means 44 mounted thereon. It will be noted that the operator steers the truck by means of a steering apparatus 12 and that this apparatus 12 is located so that the operator faces the semi-trailer when he is maneuvering the semi-trailer onto the railway vehicle.

The operation of the truck, then, is as follows:

The truck 2 is driven to the parking lot or place where the semi-trailer 38 is resting on its landing gear 42. The forked lift 18, if not already lowered, may then be lowered by lowering the hydraulic jack 24 which acts on the transverse beam 22. When the lift 18 has been suitably lowered, the hole 31 of the king pin receiving means 30 may be located below the semi-trailer king pin 40 either by maneuvering or by the ram 32. The hydraulic jack 24 is then energized causing the lift 18 to pivot about the pivot pins 16 and raise the semi-trailer 38 off its landing gear 42 so that it may then be maneuvered by means of its king pin onto the railway vehicle. After being maneuvered onto the vehicle so that the king pin 40 is located over the support 44, the jacks 46 and 48 may then be raised to lift the king pin 40 out of the hole 31.

The king pin receiving means 30 is then retracted from below the king pin 40 by means of the hydraulic ram 32 which causes pins 28 attached to the king pin receiving means 30 to slide in the longitudinal slots 26. Once the king pin receiving means 30 has been moved out of the way, the semi-trailer may then be lowered by either the hydraulic jacks 46, 48 or by lowering the forked lift 18 by means of the hydraulic jack 24. It will be apparent that the semi-trailer can also be lowered by lowering both the hydraulic jacks 46, 48 and the forked lift 18 by means of hydraulic jack 24. The truck and its hydraulic lift are then ready to go to the parking lot and pick up another semi-trailer for loading.

To unload the semi-trailer from the railway vehicle the operation is reversed; that is, the forked lift with the hydraulic ram 32 retracted is driven under the semi-trailer with a beam 20 on either side of the support 44. The jacks 46 and 48 are then raised either alone or by the lift 18 to lift the king pin 40 from the support 44. The hydraulic ram is then energized to position the king pin receiving hole 31 below the king pin. The jacks 46 and 48 are then lowered so that king pin 40 is received in hole 31. It is then a simple matter for the truck to pull the semi-trailer off the railway vehicle and deposit it in any parking area provided for the semi-trailers.

A feature of this invention that deserves special emphasis is the location of the hydraulic jacks 46 and 48 diagonally on either side of the king pin receiving means 30. By locating the jacks in this manner a jack will always be located on each side of the semi-trailer king pin receiving means when the jacks 46, 48 are used to raise from or lower the king pin into the hole 31 regardless of the permissible angle that can be formed by the truck and semi-trailer. In other words, when the forward end of the semi-trailer 38 is supported on the jacks 46, 48 it will be supported on both sides of the king pin thereby providing the stability necessary to prevent tipping which might otherwise occur. If the trucks are used to load and unload on the side of the railway vehicle opposite to that shown, the positions of jacks 46 and 48 should be located diagonally opposite.

It is apparent that other means besides hydraulic means can be used to operate the jacks 24, 46, 48, and the ram 32 and that these means can be located in positions other than those in which they are shown to operate lift 20 and the king pin receiving means 30. It is therefore intended that the claims for this invention shall cover all modifications thereof which will readily occur to those skilled in the art.

I claim:

1. A lift truck comprising a truck frame, a lift pivotally connected to said frame, lifting means interposed between said frame and said lift remote from said pivotal connection, king pin receiving means mounted on said lift and movable longitudinally with respect thereto, means to move said king pin receiving means longitudinally with respect to said lift, and lifting means on said lift independently movable relative to the movement of said king pin receiving means.

2. A loading truck for loading a semi-trailer provided with a semi-trailer king pin onto railway vehicles or the like comprising a truck frame supported at the ends thereof by rotatable wheels and axles, a beam pivotally connected to said frame intermediate the ends thereof, lifting means interposed between said frame and said beam remote from said pivotal connection for raising the free end of said beam, semi-trailer king pin receiving means on the free end of said beam and movable longitudinally with respect to said beam, means acting between said beam and said king pin receiving means for moving said king pin receiving means longitudinally with respect thereto, and a pair of individual lifting means on the free end of said beam acting at right angles to said beam and engageable with said semi-trailer, said lifting means being diagonally located with respect to said king pin receiving means and remote therefrom to engage said semi-trailer on opposite sides of its king pin.

3. A loading and unloading truck for maneuvering a semi-trailer having a king pin depending from the underside thereof onto means provided with semi-trailer king pin supporting means including a truck frame, a lift operatively connected to said frame, lifting means interposed between said lift and said frame for raising and lowering said lift relative to said frame in a substantially vertical direction, semi-trailer king pin receiving means on said lift and movable relative thereto in a substantially horizontal direction, and substantially vertically acting lifting means on said lift adjacent said king pin receiving means engageable with the underside of said semi-trailer for raising and lowering its king pin relative to the king pin receiving means on said lift.

4. A lift truck comprising a truck frame supported at either end thereof by rotatable wheels and axles, a forked lift having an end pivotally connected to said frame intermediate the ends thereof, lifting means interposed between said lift and said frame remote from said pivotal connection and intermediate the ends of said lift, semi-trailer king pin receiving means movable longitudinally with respect to said lift at the free end thereof, means to move said king pin receiving means longitudinally with respect to said lift, lifting means on the free end of said lift movable at right angles to movement of the king pin receiving means, and means for operating said truck located so that the operator in operating said truck faces the free end of said lift.

5. A loading and unloading truck for maneuvering semi-trailers and the like having a depending king pin at one end thereof onto means provided with semi-trailer king pin receiving means comprising a truck frame supported at either end thereof by rotatable wheels and axles, a forked lift having an end pivotally connected to said frame intermediate the ends thereof, said lift including a pair of beams spaced at the free end of said lift, lifting means interposed between said frame and said lift remote from said pivotal connection and intermediate the ends of said lift for raising and lowering said lift relative to said frame in a substantially vertical direction, semi-trailer king pin receiving means on said lift at the free end thereof and movable relative thereto in a substantially horizontal direction, said semi-trailer king pin receiving means extending between said beams, substantially vertically acting lifting means on said lift adjacent said king pin receiving means movable at right angles to the movement of said king pin receiving means and engageable with the underside of a semi-trailer at its king pin end for raising and lowering the king pin of said semi-trailer relative to the king pin receiving means of said lift, said vertically acting lifting means including a pair of individual jacks diagonally located on said lift relative to said king pin receiving means on said lift, one of said jacks being mounted on one of said beams, the other of said jacks being mounted on the other of said beams.

6. A lift truck comprising a truck frame supported at either end thereof by rotatable wheels and axles, a forked lift having an end pivotally connected to said frame intermediate the ends thereof, lifting means interposed between said frame and said lift remote from said pivotal connection and intermediate the ends of said lift, king pin receiving means movable longitudinally with respect to said lift at the free end thereof, means to move said king pin receiving means longitudinally with respect to said lift, and lifting means on the free end of said lift movable at right angles to the movement of said king pin receiving means.

7. A vehicular device for maneuvering trailers and the like having a depending king pin at one end into and out of king pin engaging relation with other structures, comprising a supporting frame movable laterally relative to such structures, a beam carried by and having a pivotal connection with said frame about which one end of the beam may be raised and lowered while the beam is located under the king pin end of the trailer, beam operating means interposed between the frame and said beam and remote from said connection for effecting the raising and lowering of said beam end, king pin receiving means carried by said beam and fixedly adjustable relative thereto into and out of positions vertically opposite the trailer king pin when said beam is properly located under said end of the trailer, and means mounted on the beam and operable to raise and lower said end of the trailer relative to said king pin receiving means whereby the king pin may alternatively be engaged with and disengaged from said king pin receiving means and said other structures, respectively.

8. A lift truck comprising a truck frame, a lift movably supported on said frame, lifting means interposed between said frame and said lift to raise said lift relative to said frame, load-receiving means mounted on said lift, mechanical means to move said load-receiving means longitudinally with respect to said lift, and load-engaging lifting means on said lift independently movable relative to the movement of said load-receiving means.

References Cited in the file of this patent

UNITED STATES PATENTS

| | | |
|---|---|---|
| 1,970,030 | Burton | Aug. 14, 1934 |
| 2,439,232 | Wyman et al. | Apr. 6, 1948 |
| 2,491,824 | McKee | Dec. 20, 1949 |
| 2,522,385 | Lindsay | Sept. 12, 1950 |
| 2,628,734 | Jannsen | Feb. 17, 1953 |
| 2,637,453 | Cleveland | May 5, 1953 |

OTHER REFERENCES

"Modern Railroads," periodical, October 1953, pgs. 46 and 47, article entitled, "New plan for piggy backs."